F. DE W. PITCHER.
GAS CHAIN FIXTURE.
APPLICATION FILED AUG. 1, 1912.
1,046,489.
Patented Dec. 10, 1912.
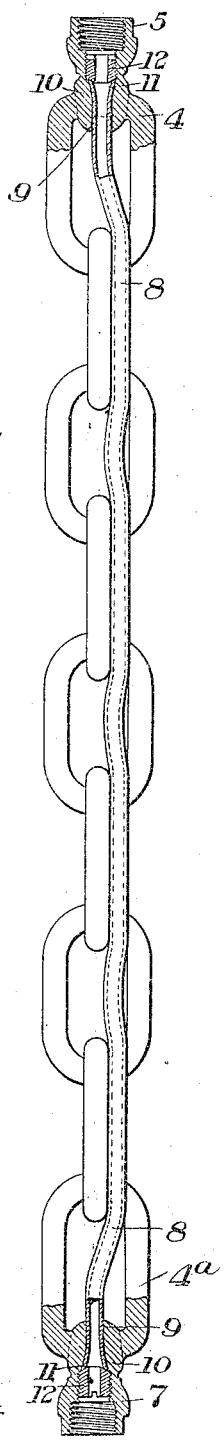
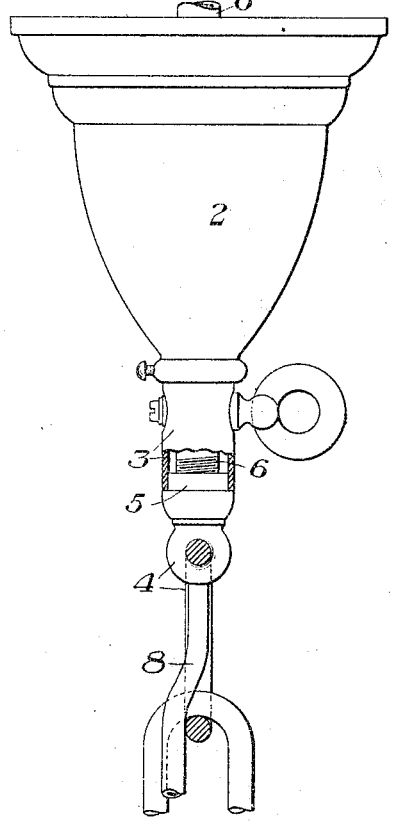
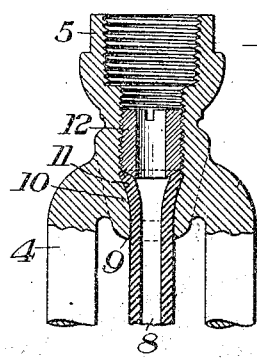
WITNESSES
INVENTOR
Frederic DeWitt Pitcher

UNITED STATES PATENT OFFICE.

FREDERIC DE WITT PITCHER, OF ROCHESTER, NEW YORK, ASSIGNOR TO WELSBACH LIGHT COMPANY, OF GLOUCESTER CITY, NEW JERSEY, A CORPORATION OF NEW JERSEY.

GAS-CHAIN FIXTURE.

1,046,489.

Specification of Letters Patent.

Patented Dec. 10, 1912.

Application filed August 1, 1912. Serial No. 712,728.

*To all whom it may concern:*

Be it known that I, FREDERIC DE WITT PITCHER, a resident of Rochester, Monroe county, New York, have invented a new and useful Improvement in Gas-Chain Fixtures, of which the following is a full, clear, and exact description, reference being had to the accompanying drawings, forming part of this specification, in which—

Figure 1 is a side elevation, with parts in section, of a gas chain and fixture embodying my invention; Fig. 2 is a view mainly in side elevation but with one of the links in section, showing the attachment of the upper end of the chain; and Fig. 3 is an enlarged sectional view showing how the tubing is connected to the end link.

My invention has relation to gas chain fixtures, such as are employed in suspending an overhead burner. These fixtures consist of a plurality of loosely engaged links, the gas being conducted through a tube which interlaces or is adjacent to the links. As heretofore constructed, it has been necessary to solder or braze the ends or terminals of the gas-carrying tube to the end members of the fixture.

The object of my invention is to obviate the necessity for these soldered or brazed connections; and to provide means whereby a gas fitter can readily supply and put up any required length of the chain fixture without the necessity of taking it to a shop and having the gas supply tube brazed or soldered in position. In lieu of these brazed or soldered joints, I provide connections which are much stronger, and which will not leak when too much strain is placed on them, or by reason of some weak point in the joint.

Referring to the accompanying drawings, the numeral 2 designates the usual ceiling bell which surrounds the gas supply pipe, and which terminates at its lower end in the neck portion 3 which receives the upper link 4 of the series of links of which the fixture is formed. The upper link 4 has at its upper end the interiorly threaded socket member 5, which screws onto the lower end of the gas supply pipe 6 within the neck portion 3 of the bell. The lower link 4ª of the chain is provided with a similar socket portion 7, which screws onto the burner pipe (not shown).

8 designates the gas supply tube, which is a tube of small diameter extending down along the series of links. The upper and lower ends of this tube are bent inwardly into the plane of the end links, and are carried through openings at 9 into the open spaces 10 within the end portions of said links. They are then flared over, as shown at 11; and hollow expanding and clamping screws 12 are inserted within the socket portions 5, in the manner clearly shown in Figs. 1 and 3. These screws have beveled ends which interiorly engage the flared and beveled ends of the gas pipe and jam the outer wall of the tube against the sockets in the links and make gas-tight joints therewith.

It will be readily seen that the gas fitter can use a chain of any desired length, by removing links therefrom or adding additional links, and that he can readily cut the gas supply pipe 8 to a corresponding length and make the connections between it and the end links in the manner described, without the necessity of taking it to a shop, and without the use of any brazed or soldered joints.

I do not desire to limit myself to the precise construction and arrangement which I have herein shown and described, as it will be obvious that the details may be varied without departing from the spirit and scope of my invention as defined in the appended claims.

What I claim is:—

1. A gas chain fixture, comprising a series of links, and a gas supply pipe extending adjacent to the links, the end links having socket members, and the ends of the gas pipe extending into said socket members and connected thereto; substantially as described.

2. A gas chain fixture, having the end links of the chain provided with threaded socket portions, and a gas supply pipe having its ends extending into the end portions of the end links and flared outwardly, and hollow screw plugs seated in the socket portions and engaging the flared ends of the pipe; substantially as described.

3. A gas chain fixture having an end link provided with a socket, a gas supply pipe extending into the end portion of the link and having its end portion flared outwardly, and a screw plug seated in said socket portion and making a joint connection with the flared end of the pipe; substantially as described.

4. A gas chain fixture having an end link provided with a socket portion, and a gas pipe extending to said socket portion, and mechanical means between the ends of the pipe and the socket portion which make a tight joint without the use of solder or brazing; substantially as described.

In testimony whereof, I have hereunto set my hand.

FREDERIC DE WITT PITCHER.

Witnesses:
 FRANCIS J. BURNS,
 C. E. RICHMAN.